United States Patent Office 2,819,281
Patented Jan. 7, 1958

2,819,281
ETHYLATION PROCESS

James J. Bergin, Houston, and Arthur B. Wintringham, Baytown, Tex., assignors to Ethyl Corporation, New York, N. Y., a corporation of Delaware No Drawing. Application April 14, 1954
Serial No. 423,214

7 Claims. (Cl. 260—437)

This invention relates to the manufacture of tetraethyllead. Specifically, the invention relates to a new and improved technique of ethylating the lead content of a solid comminuted alloy of lead and at least one alkali metal with a liquid ethylating agent, particularly ethyl chloride.

Tetraethyllead has long been made by the reaction or ethylation of lead metal alloyed with an alkali metal. Most commonly, sodium lead alloy corresponding to the NaPb formula, or monosodium lead alloy, is commercially ethylated by reacting comminuted particles with liquid ethyl chloride under elevated temperature and pressure conditions. This reaction is carried out batchwise fashion, in ethylation or reaction zones in pressurized autoclaves. Heat removal from the reacting materials is obtained by several routes, viz., by heat removal through the boundary of the reaction zone by an appropriate heat exchange medium and by vaporizing and refluxing a portion of the ethyl chloride present. In carrying out this batch ethylation, an excess of the stoichiometric quantity of ethyl chloride is employed, based upon the equation given below:

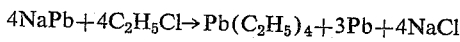

$$4NaPb + 4C_2H_5Cl \rightarrow Pb(C_2H_5)_4 + 3Pb + 4NaCl$$

In practice in batch operations, although the total quantity of ethyl chloride fed in a batch process is appreciably in excess of that indicated by the foregoing equation, because of certain limitations hereafter described, a relatively small quantity in proportion to the solids is present at any given time. Consequently, in carrying out the ethylation, the ethylation mixture within the ethylation zone retains the characteristics of a predominantly dry solids mass during and after the termination of the ethylation. At the conclusion of the processing, it appears as a sandy granular material although there is then present some recoverable ethyl chloride and of course tetraethyllead therein.

The physical attributes of the ethylation mixture arise from the relative paucity of the ethyl chloride present at any moment. By this is meant that, despite the overall feed of a stoichiometric excess of this ethylating liquid, only a minor quantity is present as such, from a weight, volume, or stoichiometric basis at any single point in the batch operation. This condition arises from inherent limitations in batch processing. More specifically, it is literally impossible to simultaneously mix all the alloy for a single batch with all the ethyl chloride. Accordingly, the rate of introduction of the ethyl chloride is roughly apportioned to the heat removal capacity of the ethylation equipment employed. This restricted rate of feed means that a certain portion of the ethyl chloride is consumed as rapidly as it is contacted with the alloy. This reaction of ethyl chloride thus results in the retention of the solids or paste characteristics of the ethylation mass already referred to.

The solids or paste characteristics of the ethylation mixture, in turn, impose a limitation on the batch processes. Thus, it is well known that heat emission from a comminuted, predominantly solids mass is much less efficient than from a boiling liquid. That is, temperatures in the interior of a predominantly solids mass are necessarily higher than at the boundaries thereof, when heat is being removed. On the other hand, the temperature of a boiling liquid is substantially uniform throughout. An adverse result of this difference, in the case of tetraethyllead manufacture, is that the mixture is maintained at an average lower temperature than could be utilized if the temperature is uniform throughout. This is because there always exists a temperature gradient through the reaction mass, so that, to avoid localized temperature excess, the average temperatures are maintained lower than considered most effective. Accordingly, it has been throught necessary to maintain the pressure on the reacting components at all times below 80 pounds per square inch, gauge. This pressure was believed to correspond to the maximum temperature conditions at any point in the reactant mixture, although only boundary temperatures were ascertainable.

A related operating practice growing out of the above described condition is the procedure after all the ethyl chloride has been introduced to the batch. It is known that reaction was continued during an uncertain period following this point of completion of the feed. Accordingly, it was universally the practice to provide a lengthy cooking period of an hour or more, during which the pressure, and consequently the apparent temperature, of the ethylation mixture are maintained at supposedly the conditions required for reaction.

The above described limitations existed in the batch ethylation of all forms of alloy. More important, however, is that the limitations of batch processing also apply to processing improved forms of alloy. For example, in U. S. Patent 2,635,107 is described the manufacture and ethylation of flaked alloy, characterized by having one side of each flake comprising the projecting faces of crystals, the said crystals have a defined dimensioned relationship to the mean thickness of the flake. In U. S. Patent 2,635,105 it is shown that, generally, alloys which are rapidly solidified, in a quiescent condition, are more reactive than slow cooled alloy. The preparation of the latter types of alloy is exemplified by the method and apparatus disclosed by the Stecher et al. Patent 2,134,091. It was therefore the firm opinion that the ultimate in batch processing production rates had been achieved, and that further capacity would necessitate additional construction. However, because of production demands and the general increase in cost of industrial operations, it was highly desirable that a further production increase be obtained with existent commercial equipment.

Accordingly, the object of the present invention is to provide a new ethylation technique which outstandingly increases the production in batch operations. Alternatively stated, an object of the present invention is to provide a batch ethylation technique which circumvents production limitations heretofore associated with batch operations characterized by low proportions of liquid ethyl chloride. A specific object of the process is to provide a new and high capacity procedure for the ethylation of highly reactive forms of alloy. A still further object is to provide a high production rate batch ethylation procedure wherein only a restricted amount of ethyl chloride is present at any particular time, and the cumulative amount of ethyl chloride introduced is less than about twice the stoichiometric proportions required. Other objects will appear hereinafter.

In general terms, the present process comprises performing a batch ethylation in the following manner. Solid, comminuted alloy is charged to the reaction space, which is then at atmospheric or near atmospheric pressure and the ambient temperature. Liquid ethyl chloride feed is then started, the feed being initially at a moderate rate. As a result of the contact with the liquid ethyl chloride, reaction is initiated with the liberation of heat and the pressure is steadily increased as rapidly as feasible by further feed of ethyl chloride. For example, in a typical operation, the pressure is allowed to continually increase at a rate of about 150 to 170 pounds per square inch per hour. The ethyl chloride is fed at a rate providing this pressure rise until a predetermined maximum pressure level is attained, generally of between about 80 to 90 pounds per square inch, gauge. At that pressure level, the rate of ethyl chloride feed is reduced, being later further adjusted so the pressure range is maintained but not exceeded.

During the rising pressure and high pressure periods, the temperature of the system is also increased, owing to the heat evolved by the reaction. During the rising pressure period, heat removal from the reacting mixture is initiated, the heat abstraction being in two ways, viz, by heat removal through the boundary of the ethylation zone, and by condensation and refluxing of ethyl chloride vaporized from the reaction mixture. These modes of heat removal are usually initiated or correlated in response to the attainment of selected pressures in the ethylation zone, or ethylation pressures, of from 50 to 70 pounds per square inch, gauge.

In addition to the initiation of coolant flow during the above described increase in pressure, a controlled vent operation is also started in this period. The purpose of this venting is to provide for removal of minor quantities of non-condensable byproduct gases from the ethylation system. This controlled venting operation is usually correlated with the pressure on the system in the range of from 10 to 15 pounds per square inch above the pressure at which the heat removal operation is started. The venting operation is carried out by venting a portion of the non-condensed vapors after discharge from the reflux condenser, i. e., after the bulk of the ethyl chloride vaporized from the ethylation mixture has been condensed. Suitable apparatus for this operation is shown in the Mitchell Patent, U. S. 2,411,453.

The previously mentioned high pressure range of 80 to 90 pounds' pressure is maintained for a brief period by controlling the rate of ethyl chloride feed, this period being, usually, approximately the same duration as the rising pressure period. The ethyl-chloride feed is terminated when the total introduced to the system, cumulative, is from 40 to 60 parts by weight to 100 parts of the alloy charged. At the termination of the elevated pressure period, the pressure starts to decrease, under the influence of the continued removal of heat and the continuation of controlled venting of non-condensables. When the pressure drops to the level at which the controlled venting was initiated, it is customarily maintained relatively constant for a brief period, during which intermittent controlled venting may advantageously be used. As the pressure continues its drop, the reaction mixture being entirely confined, that is, no venting being carried out during this period. This "confined charge" relationship can be maintained for variable periods, usually from 5 to 15 minutes, or less depending upon the degree of loading. When the pressure reaches a pressure corresponding generally to the pressure at which the heat removal operations were initiated, the cooling medium flow is discontinued. Substantially simultaneously, a full venting operation is started. By full venting is meant that the vapors from the autoclave are discharged as such to an external recovery system, rather than being a venting or discharge of a non-condensed vapor mixture which has already been exposed to cooling. By substantially simultaneously is not meant, of course, that the start of full venting must coincide to the instant with the termination of cooling. Generally, the full venting, and the heating described below, should be initiated as close in time to that point as is practical, and should not be delayed. Time lapses of 5 or 10 minutes are permissible but are to be avoided. This venting is of course not instantaneous, but restricted to provide a relatively steady pressure drop, from the pressure at termination of the controlled venting to atmospheric or substantially atmospheric pressures. A customary rate of pressure drop so accomplished is at the rate of 100 pounds per hour. The full venting is continued until the reaction system is substantially at atmospheric or near atmospheric pressure.

Concurrently with the above venting, heat is also supplied to the reaction mixture by circulating a heat medium adjacent the ethylation zone boundary, thus providing heat at 90 to 100° C. The ethylated mixture is discharged to recovery operations after reaching atmospheric pressure.

The details of the process are brought out more fully by the following examples, Example I below showing the results achieved when employing alloy produced as described in the Tanner Patent 2,635,107.

*Example I*

A specific group of ethylation autoclaves were operated in the following manner for an extended period, to provide representative results based on a large number of ethylations.

Monosodium lead alloy, produced as described in Tanner Patent 2,635,107, was charged to a reaction zone in the proportions of 50 pounds per cubic foot of free space. Liquid ethyl chloride feed was then initiated concurrently with agitation by means of an internal slow speed stirrer. The pressure on the system was allowed to rise rapidly owing to the initiation of reaction between the ethyl chloride and the alloy. The ethyl chloride feed was continued, however, until the pressure was in the range of 80 to 85 pounds per square inch, gauge. As the pressure rose, at an ethylation pressure of 52 pounds per square inch, a flow of cooling medium at about 18° C. was started to a jacket surrounding the boundary of the autoclave zone, and in addition cooling medium at about 40° C. was started to a condenser connected to the autoclave for refluxing condensed ethyl chloride vaporized from the reaction zone. At a slightly higher pressure, of 60 to 62 pounds per square inch, gauge, an automatic vent system operated release to a supplemental recovery system of a small steady stream of the non-condened vapors. These vapors included of course some ethyl chloride, but comprised principally a small amount of alkane hydrocarbons formed as by-products of the reaction. At the elevated pressure heretofore referred to, 80 to 90 pounds per square inch, gauge, the rate of feed of the ethyl chloride was adjusted so that the pressure did not continue to rise, but was maintained constant for a period sufficient to allow a total, or cumulative feed, of about 45 pounds of ethyl chloride to 100 pounds of alloy initially charged. Following termination of the ethyl chloride feed, the ethylation pressure began to decrease under the influence of the continued heat removal and the controlled venting of non-condensables. As the pressure dropped it approached the level of about 60 pounds per square inch, at which the vent system automatically operated. At this pressure level the vent system operated as an on-off control so that the pressure was maintained substantially constant for a brief period. As the evolution of gas decreased the vent system closed and the pressure again began to drop. The ethylation system or mixture was thus entirely sealed off, and this condition was maintained for approximately 10 minutes.

The pressure continued to drop, however, under the influence of the heat removal. When the ethylation pressure dropped to the pressure at which boundary cooling and refluxing were initiated, venting of the residual or excess ethyl chloride in the system was initiated. This venting discharged the vapors to a separate recovery system, operating at only nominal pressures of the order of 3 to 10 pounds' pressure and the ethylation pressure rapidly dropped to this level. Concurrently with the full venting, heat was supplied to the ethylation mixture by circulating hot water at about 95° C. through the boundary heat transfer jacket. At the conclusion of the venting operation, the last residual few pounds of pressure were released and the autoclave then prepared for discharging. The reaction mass was discharged to a steam distillation recovery unit in the conventional manner.

An extended series of commercial scale ethylations in a group of ten autoclaves was carried out in the foregoing manner. The yield of tetraethyllead was in a high range of 86–88 percent based upon the equation heretofore given, and a production of 619,000 pounds of tetraethyllead per week was obtained. Uniform batches of over 3500 pounds of alloy were processed for this production.

As is hereafter described, the benefits of the present improved process are particularly marked when batch ethylations are carried out with high loading factors and with limited boundary areas. By high loading factors is meant that the proportions of solid alloy charged to the ethylation zone are high, that is, in the range of 45 to 60 pounds per cubic foot of the ethylation zone. Limited boundary cooling refers to the ratio of heat removal surface to the cubic volume of the ethylation zone, a limited boundary cooling area ratio being any ratio below 1.5 square feet per cubic foot of ethylation zone. In the foregoing example, the boundary cooling area ratio was 1.1 square feet per cubic foot.

*Example II*

The procedure of the foregoing Example I was repeated except as described below. The same sized charges of alloy were fed to the ethylation autoclaves. The feed of ethyl chloride was again at a rate to provide a rapid increase in pressure to 80 pounds per square inch. After the conclusion of the high pressure portion of the feeding operation (80 to 90 pounds), the pressure was reduced as before by the joint action of venting of non-condensables and refluxing and boundary cooling. The controlled venting was terminated at a pressure of 62 pounds and the pressure was further reduced solely by the cooling operations while the ethylation zone was sealed (except for the closed circuit reflux condenser as in Example I). The cooling medium flow to the boundary cooling surface and the reflux condenser was discontinued at a pressure of 52 pounds. This pressure was maintained for a period corresponding roughly to the time required to feed the ethyl chloride. The total venting operation was then started and the ethylation pressure reduced to approximately atmospheric pressure. Heat was applied during the latter part of the venting operation. In the extended operation of the same group of ethylation autoclaves according to the above procedure a production of 517,000 pounds of tetraethyllead was achieved per week.

From comparison of the production results according to Example I with the production achieved by the conventional procedure, it is seen that an outstanding and surprising production increase is provided. Thus, by the present improved process the production from a standard plant is increased to a level of 120 percent of previously established capacity.

The following example describes the application of the present process to processing alloy commercially referred to as "bed cast" alloy. This is alloy which is originally solidified in a large slab and then comminuted, generally according to the procedure and using the apparatus disclosed in Stecher Patent 2,134,091.

*Example III*

The same group of reaction zones employed in Example I and II are charged with bed cast alloy, again in the proportions of about 50 pounds per cubic foot of reaction space. The procedure described in Example I is followed in over 500 separate ethylations during an extended period. A production of about 605,000 pounds per week of tetraethyllead is obtained.

*Example IV*

The procedure described in Example II was repeated in over 500 ethylations, but using bed cast alloy as in Example III, in a group of reaction zones corresponding to those used in the foregoing examples. A production rate of 515,000 pounds of tetraethyllead per week was obtained.

Similarly to the striking increase in production demonstrated by Examples I and II, comparison of Examples III and IV show a similar new high production capacity, representing 117 percent of the capacity previously possible.

The process of the present invention accomplishes an outstanding gain in production from a given commercial installation, as shown by the foregoing examples. The full explanation of this production rise is not explicitly understood, but it appears that the variables of loading factor, reaction volume, and cooling and heating have not heretofore been correctly correlated. The benefits of the process are exhibited most markedly under conditions at which the proportions of material processed are so large, relative to the reaction volume provided, that the production capacity is limited by the heat removal difficulties from such masses.

Accordingly, the process finds greatest utility in batch operations wherein alloy is processed in batches of 3500 pounds or more and in proportions of from about 45 to 60 pounds per cubic foot of reaction zone, and wherein the boundary cooling area is confined to a boundary: volume ratio of less than 1.5 square feet:1 cubic foot.

It is not absolutely essential that the boundary cooling, refluxing, and the venting of non-condensables be initiated and terminated at precisely the same pressure conditions. In virtually all practical cases, this will be done because it admits of ready application of automatic devices to accomplish this process adjustment. Further, it is not absolutely essential that the venting of non-condensables be carried out at a higher pressure than the pressure at which the boundary cooling has been initiated or terminated. As a matter of fact, such operating conditions arise from the limitations of the heat transfer medium available for the several services. If a colder coolant than described in the foregoing examples is available for operation of the reflux condenser, it is sometimes found desirable to provide for termination of the non-condensable venting operation at substantially the same ethylation pressure at which the boundary cooling is discontinued and full venting and heating started. Preferably a cooling medium at a temperature of 40 to 50° C. is employed for the refluxing.

As previously noted, the batch ethylation of the lead of solid alloys is a very peculiar phenomenon, in that although the total liquid ethyl chloride employed amounts to a substantial volumetric excess over the alloy considered entirely separately, during the course of the reaction the solids undergo a substantial change. This change goes through a series of modifications in form which result in appreciable increase in volume. The precise occurrence chemically accompanying the volume and appearance changes is not adequately understood, but it is postulated that the sodium content of the initial alloy is leached out or partially reacted with the ethyl chloride possibly resulting in formation of a free radical adjacent the surface of the residual lead which could form a complex which in turn dissociates to form tetraethyllead and lead metal. In any event, the original mass of crystalline alloy solids is transformed into a swollen mass during the progress of a reaction. Inasmuch as it is impossible to introduce all the ethyl chloride at one instant, the overall proportions introduced to a reaction zone are not significant as indicating the state of the reacting mixture at any particular moment. In other words, no large proportion of free liquid ethyl chloride is present in the reaction zone at any particular time. Because the change in physical attributes of the solids vastly increases the porosity and absorptivity thereof, the ethyl chloride molecules present are probably associated by adsorption with the solids if indeed they have not immediately partly reacted upon such association.

Although it is not intended to limit the invention by a theoretical explanation, it is believed that the significance of the ethylation pressure during the final part of the ethylation has been heretofore misunderstood and misapplied. It has always been thought that it was necessary to maintain the ethylation pressure at an elevated level for an appreciable period of time following termination of the heat removing operation. It is now found that the pressure can be reduced and the production is greatly increased and the yield is substantially unaffected. Accordingly, it is believed that there exists in the ethylation mixture an intermediate which further reforms to produce additional tetraethyllead and that such reformation is accomplished by boundary heating alone regardless of the pressure.

In support of the foregoing hypothesis, it has been found that the distribution of course of batch reactions varies with the progress of the reaction. A series of ethylations were made in which very small amounts—less than 200 grams—of monosodium lead alloy were ethylated with ethyl chloride. These charges were vigorously agitated during ethylation and ethylation zones having high boundary area:volume ratios of about 4:1 were employed. This combination of operating factors assures that there will be no gradation in conditions through the reacting mixtures, such as is encountered in the commercial scale process described above.

In the course of a large number of ethylations the total products for different reaction periods were determined. It was found that the disappearance, or reaction, of the sodium metal content of the alloy could be accurately balanced with the formation of tetraethyllead and by-product gases consisting essentially of ethane, butane, and ethylene. However, the rate of formation of the by-products was much greater during the initial part of the reaction than during the later part. Thus, during the first quarter of the ethylation period, for every 100 parts of sodium reacted to produce tetraethyllead, 26 parts reacted to produce non-usable by-product gases. During the first half of the reaction, however, this distribution was only 16 parts to 100, showing that the rate of sodium going to side reactions was appreciably less during the second quarter of the reaction period. This reduced rate of side reactions was further exhibited during the last half of the ethylation.

Applying these findings to the present process, it is seen that in the latter portion of the reaction the reacting materials proceed via a different route to produce tetraethyllead. In addition, since an extended pressurized period is not employed in the present process it is believed that the tetraethyllead produced is the result of the reformation of an intermediate which does not require an application of pressure, but instead is accomplished by the sensible heat already existent within the ethylation mixture and further supplied by the boundary heating.

The total amount of ethyl chloride fed represents an appreciable excess over the stoichiometrical quantity, of the order of 60 to 80 percent excess. However, despite this appreciable apparent excess, the ethylation mixture retains the above described predominantly solids characteristics during the processing of an entire batch. Although it is known that a large volumetric and weight excess of ethylating liquid provide advantageous features and results, these features cannot be utilized in batch operations. Thus, in Neher et al. Patent 2,644,827, a continuous process is described wherein the described large excess is maintained by concurrent feed and withdrawal of ethyl chloride and alloy to an ethylation zone wherein the solid and liquid components are agitated under controlled conditions. Unfortunately, in batch processing equipment, the advantage of a large liquid excess cannot be realized because of the necessary initial charge of a single load of alloy.

As apparent from the examples given above, the process is applicable to the various forms of alloy known in the art. Although the greatest production increase is realized with the highly reactive forms of alloy described in U. S. Patents 2,635,105 and 2,635,107, similar production increases are obtained with alloy produced in the more conventional manner. Thus, alloy which has been prepared as described by the Fielding Patent 1,884,640 and by the Stecher Patent 2,134,091 can also be processed. In addition, alloys having higher proportions of alkali metals can be advantageously employed, for example the high sodium low lead alloys used in the Beste et al. process, U. S. 2,653,159. The use of catalysts for accelerating the initial portion of the ethylation reaction similarly is not precluded, for example, ketones, esters, amides, and acetals. In addition, it will be understood that the inclusion of minor amounts of alkaline metals other than sodium is within the scope of the process. For example, the ternary alloys employed in the process described in U. S. Patent 2,535,106 can be advantageously used.

Having described my process in full, what I claim is:

1. A batch ethylation of an alkali metal lead alloy comprising charging comminuted solid alloy to an ethylation zone, feeding ethyl chloride at a rate sufficient to initiate reaction and rapidly raise the ethylation pressure within said zone to about 80 to 90 pounds per square inch, and terminating the feed of ethyl chloride when from 40 to 60 parts by weight of ethyl chloride to 100 parts by weight of alloy have been fed, initiating cooling, by heat transfer through the boundary of the zone, said cooling hereafter being referred to as boundary cooling, and refluxing and controlled venting of non-condensables upon attainment of ethylation pressures of at least 50 pounds per square inch gauge during the feed of ethyl chloride and continuing said boundary cooling, refluxing and venting of non-condensables following the completion of the ethyl chloride feed whereby the pressure is reduced, terminating the controlled venting of non-condensables, refluxing, and boundary cooling at ethylation pressures of at least 50 pounds per square inch gauge, and initiating heating through the boundary of the ethylation zone and full venting substantially concurrently with the termination of the boundary cooling to complete the ethylation, and thereby reducing the ethylation zone pressure to substantially atmospheric and discharging the ethylated mixture from the ethylation zones.

2. A batch ethylation of an alkali metal lead alloy comprising charging comminuted solid alloy to an ethylation zone in proportions of from 45 to 60 pounds of alloy per cubic foot, feeding ethyl chloride to said zone at a rate sufficient to initiate reaction and rapidly raise and maintain the ethylation pressure within said zone at about 80 to 90 pounds per square inch, and terminating the feed of ethyl chloride when from 40 to 60 parts of ethyl chloride to 100 parts of alloy have been fed, initiating cooling, by heat transfer through the boundary of the zone, said cooling hereafter being referred to as boundary cooling, and refluxing, and controlled venting of non-condensables in response to ethylation pressures above 50 pounds per square inch during the feed of ethyl chloride and continuing said boundary cooling, refluxing, and controlled venting following the completion of the ethyl chloride feed whereby the pressure is reduced, terminating the controlled venting when the ethylation pressure has decreased to the pressure at which said venting was initiated, then further reducing the pressure by continuing the boundary cooling and refluxing, and then discontinuing the said boundary cooling and refluxing and substantially concurrently initiating full venting and heating through the boundary of the ethylation zone to complete the ethylation.

3. A batch ethylation of alkali metal lead alloy comprising charging comminuted, solid alloy to an ethylation zone in the proportions of 45 to 60 pounds per cubic foot of ethylation zone, said zone having a ratio of boundary cooling area to volume of less than 1.5 square feet per cubic foot of ethylation zone, then feeding ethyl chloride to said zone while agitating, the ethyl chloride being fed at a rate sufficient to rapidly and continuously raise and maintain the ethylation pressure within said zone at 80 to 90 pounds per square inch gauge and terminating the feed of ethyl chloride when from 40 to 60 parts of ethyl chloride to 100 parts of alloy have been fed, initiating cooling, by heat transfer through the boundary of the zone, said cooling hereafter being referred to as boundary cooling, and a refluxing of condensed vapors, in response to the attainment of an ethylation pressure of 50 to 60 pounds per square inch gauge during the feed of ethyl chloride, and initiating venting of non-condensables at an ethylation pressure of 60 to 70 pounds per square inch gauge and continuing said boundary cooling, refluxing and controlled venting after terminating the feed of ethyl chloride, thereby reducing the ethylation pressure, terminating the controlled venting when the ethylation pressure has decreased to the pressure at which said venting was initiated, and terminating the boundary cooling and refluxing at the ethylation pressure at which said cooling and refluxing were initiated, and initiating full venting and heating through the boundary of the ethylation zone substantially concurrently with the termination of the refluxing and boundary cooling.

4. A batch ethylation of an alkali metal lead alloy comprising charging comminuted, solid alloy to an ethylation zone in the proportions of 45 to 60 pounds per cubic foot of ethylation zone, said zone having a ratio of boundary cooling area to volume of less than 1.5 square feet per cubic foot of ethylation zone, then feeding ethyl chloride to said zone at a rate sufficient to initiate reaction and rapidly raise and maintain the ethylation pressure within said zone at 80 to 90 pounds per square inch gauge and terminating the feed of ethyl chloride when from 40 to 60 parts by weight of ethyl chloride to 100 parts by weight of alloy are fed, initiating cooling, by heat transfer through the boundary of the zone, said cooling hereafter being referred to as boundary cooling, and refluxing, and controlled venting in response to ethylation pressures above 50 pounds per square inch gauge during the feed of ethyl chloride and continuing said boundary cooling, refluxing, and venting following the completion of the ethyl chloride feed, thereby reducing the pressure, terminating the controlled venting when the ethylation pressure has decreased to the pressure at which said venting was initiated, further reducing the pressure by continuing the boundary cooling and refluxing, after the controlled venting has been fully discontinued and initiating venting of the reaction vapors and heating through the boundary of the ethylation zone at a time of from 5 to 15 minutes following the termination of the controlled venting, continuing said full venting until the ethylation pressure has dropped to substantially atmospheric, and then discharging the ethylated mixture from the ethylation zone.

5. A batch ethylation of a reactive mono-sodium lead alloy comprising charging comminuted solid alloy to an ethylation zone in the proportions of 45 to 60 pounds per cubic foot of ethylation zone, said zone having a ratio of boundary cooling area to volume of less than 1.5 square foot per cubic foot of ethylation zone, then feeding ethyl chloride to said zone at a rate sufficient to initiate reaction and rapidly raise and maintain the ethylation pressure within said zone at 80 to 90 pounds per square inch gauge, and terminating the feed of ethyl chloride when from 40 to 60 parts by weight of ethyl chloride to 100 parts by weight of alloy have been fed, initiating cooling by heat removal through the boundary of the ethylation zone with a liquid at 5° to 20° C., said cooling being hereafter referred to as boundary cooling, and cooling and reflux of ethylation vapor condensables at about 40° to 50° C., said boundary cooling and refluxing being initiated in response to attainment of an ethylation pressure of 50 to 60 pounds per square inch gauge, and initiating venting of non-condensed vapors from the refluxing in response to attainment of an ethylation pressure of 60 to 70 pounds per square inch gauge, continuing said boundary cooling, refluxing, and venting of non-condensables after termination of the ethyl chloride feed, thereby reducing the ethylation pressure, terminating the venting of non-condensables and the boundary cooling and refluxing at the same ethylation pressure as initiated, and initiating substantially concurrently with termination of the boundary cooling full venting of the ethylation vapors and heating through the boundary of the ethylation zone at 90° to 100° C., thereby completing the ethylation while reducing the pressure to substantially atmospheric and then discharging the ethylated mixture from the ethylation zone.

6. A batch ethylation of an alkali metal lead alloy comprising charging comminuted solid alloy to an ethylation zone, feeding ethyl chloride at a rate sufficient to initiate reaction and rapidly raise the ethylation pressure within said zone at 80 to 90 pounds per square inch, and terminating the feed of ethyl chloride when from 40 to 60 parts by weight of ethyl chloride to 100 parts by weight of alloy have been fed, initiating cooling by heat removal through the boundary of the ethylation zone with a liquid at 5° to 20° C., said cooling being hereafter referred to as boundary cooling, cooling and reflux or ethylation vapor condensables at about 40° to 50° C., and controlled venting of non-condensables upon attainment of ethylation pressures of at least 50 pounds per square inch gauge during the feed of ethyl chloride and continuing said boundary cooling, refluxing and venting of non-condensables following the completion of the ethyl chloride feed whereby the pressure is reduced, terminating the controlled venting of non-condensables, refluxing, and boundary cooling at ethylation pressures of at least 50 pounds per square inch gauge, and initiating heating through the boundary of the ethylation zone at 90° to 100° C. and full venting substantially concurrently with the termination of the boundary cooling, to complete the ethylation, and thereby reducing the ethylation zone pressure to substantially atmospheric and discharging the ethylated mixture from the ethylation zone.

7. A batch of ethylation of an alkali metal lead alloy comprising charging comminuted solid alloy to an ethylation zone, feeding ethyl chloride thereto at a rate sufficient to produce a reaction with said alloy at elevated temperatures and pressures, controlling said temperature and pressure within safe limits by heat removal through the boundary of said ethylation zone, said heat removal hereafter being referred to as boundary cooling, refluxing and venting of the reaction by-product gases until after the ethyl chloride feed is completed and the pressure resulting from said reaction has been reduced to a pressure of above about 50 pounds per square inch gauge then terminating said by-product venting, refluxing and boundary cooling and initiating full venting and heating through the boundary of the ethylation zone substantially simultaneously with the termination of the boundary cooling, thereby reducing the ethylation zone pressure to substantially atmospheric and discharging the ethylated mixture from the ethylation zone.

References Cited in the file of this patent

UNITED STATES PATENTS

| | | |
|---|---|---|
| 1,983,535 | Calcott et al. | Dec. 11, 1934 |
| 2,087,656 | Rice | July 20, 1937 |
| 2,091,112 | Amick | Aug. 24, 1937 |
| 2,411,453 | Mitchell et al. | Nov. 19, 1946 |
| 2,535,190 | Callingaert et al. | Dec. 26, 1950 |